June 16, 1925.
G. F. MILES
FISHING REEL
Filed May 8, 1924
1,542,403
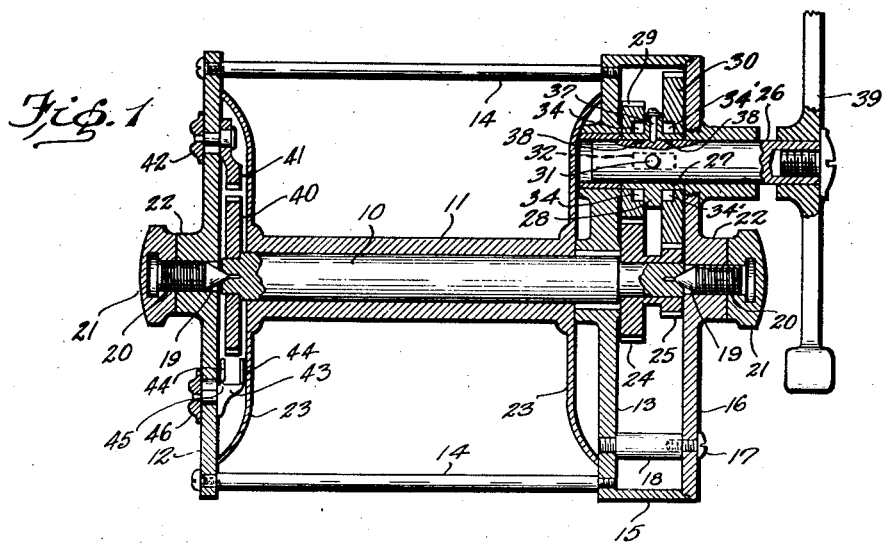
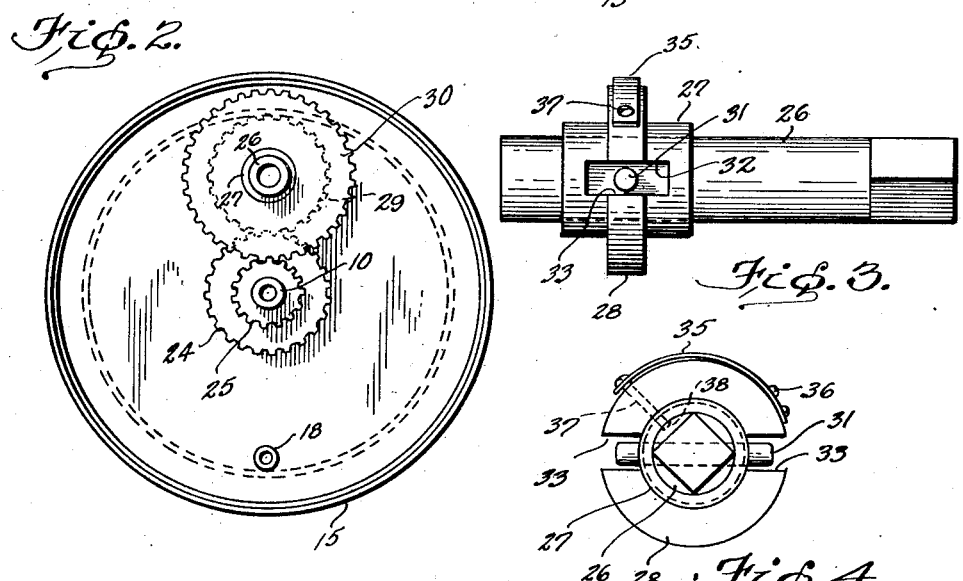
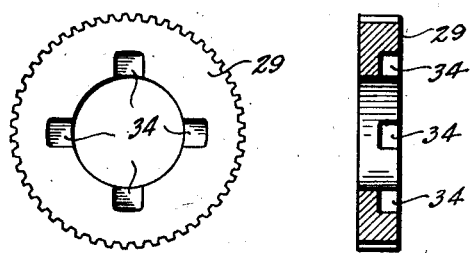
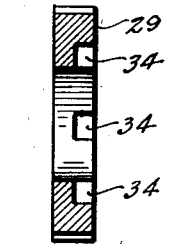
INVENTOR.
George F. Miles
BY Wooster & Davis
ATTORNEYS.

Patented June 16, 1925.

1,542,403

UNITED STATES PATENT OFFICE.

GEORGE F. MILES, OF TORRINGTON, CONNECTICUT.

FISHING REEL.

Application filed May 8, 1924. Serial No. 711,806.

*To all whom it may concern:*

Be it known that I, GEORGE F. MILES, a citizen of the United States, residing at Torrington, county of Litchfield, State of Connecticut, have invented a new and useful Fishing Reel, of which the following is a specification.

This invention relates to reels, such as are used on fishing rods, and has for an object to provide a reel of this character in which a plurality of relative speeds may be secured between the spool and the winding crank together with a free spool, and furthermore, in which these different relative speeds or free spool may be secured by a simple manipulation of the crank and without removing the hand therefrom.

It is also an object of the invention to provide a reel which will be very simple in construction, comprising a minimum number of parts, and so will be strong and durable and not easily gotten out of order.

With these and other objects in view, I have devised the construction illustrated in the accompanying drawing forming a part of this specification, similar reference characters being employed throughout the various figures to indicate corresponding elements. In this drawing:

Fig. 1 is a longitudinal section through the reel complete, showing the elements in the positions for a free running spool.

Fig. 2 is an end elevation looking from the right of Fig. 1 with the outer end plate removed.

Fig. 3 is a side elevation of the control spindle.

Fig. 4 is an end elevation thereof looking from the right of Fig. 3.

Fig. 5 is a side elevation of one of the driving wheels, and

Fig. 6 is a transverse section thereof.

The reel comprises a rotatable spindle 10 upon which is mounted the spool 11, this spool being secured to the spindle so as to rotate therewith. The operating mechanism is mounted in a frame comprising the end plates 12 and 13 tied together by suitable tie-rods 14, the member 13 being preferably provided with flanges 15 forming a housing for the drive mechanism for the spool, and the open end of this housing is closed by a plate 16 secured thereto by any suitable means, such as screws 17, threaded into spacing posts 18, threaded at the opposite end to the plate 13. The spindle 10 carrying the spool 11 is mounted to rotate on suitable end bearings carried by the plates 12 and 16. In order to give a free running spindle and to allow for adjustment to compensate for wear, the spindle is provided with conical recesses in the ends thereof in which are seated the hardened steel conical bearings 19. These bearings are parts of screws 20 threaded in the plates 12 and 16 in which they are, therefore, adjustable. In order to protect these screws and also to lock them in adjusted positions, caps 21 are provided which are threaded onto the projecting ends of the screws, and by clamping these caps against the ends of the bosses 22 they act as lock nuts to secure the pivot screws in proper position. The spool 11 includes the usual flanges or side plates 23 for guiding the line.

I have provided an improved operating and controlling means for the spool which will allow the operator to secure different relative speeds between the winding crank and the spool as well as a free running spool as desired, and any one of these conditions may be secured by a simple manipulation of the winding crank without removing the hand from the handle. For this purpose, secured to the spindle 10 are a pair of gears 24 and 25 of different sizes, and offset laterally from the spindle 10 but arranged substantially parallel therewith is a crank shaft or spindle 26 mounted in suitable bearings in the plates 13 and 16. Mounted loosely on the shaft or spindle 26 between the plates 13 and 16 is a sleeve 27 provided with a central flange 28, and mounted to rotate on this sleeve on the opposite sides of the flange 28 are a pair of gears 29 and 30 meshing respectively with the gears 24 and 25. I preferably make the ratio of the gears 29 and 24, 1 to 1, and of the gears 30 to 25, 3 to 1, though of course, other ratios may be employed if found practical or desirable. Carried by the shaft or spindle 26 is a transverse pin 31 projecting at its opposite ends from the sides of the shaft and extending through longitudinal slots 32 in the sleeve 27, the flange 28 being provided with notches 33 in alignment with the slots for passage of the projecting ends of this pin. The gears 29 and 30 are provided in the sides thereof next to the flange 28 with notches or recesses 34 and 34' respectively, any desired number being employed, but I prefer four in each gear set at about ninety degrees apart as this number has been found sufficient for reliable operation. Carried by the flange 28 is a spring 35. Secured to this flange by any suitable means, such as screws 36, and carried by the free end of this spring is a pin 37 slidable in a radial opening in the flange with its free end adapted to project into notches 38 in the shaft or spindle 26, there being one of these notches corresponding to each position of the spindle. The spindle 26 is operated by the usual winding crank 39 secured to the projecting end thereof which crank has the usual handle, not shown.

The operation is as follows:

When the elements are in the positions shown in Fig. 1 the spool is free as the pin 31 is in alignment with the notches 33 in the flange 28. The gears 29 and 30, are therefore, free to rotate and the spool may run free. If the angler catches a large fish, by pushing inwardly on the winding crank the pin 31 is moved into a pair of the notches 34 in the gear 29 so that this gear is now locked to the spindle 26 and the angler is on equal terms with the fish. If on the other hand, he wishes to reel in the line rapidly, by pulling outwardly on the crank handle, pin 31 is moved into alignment with a pair of the notches 34' in the gear 30 so that the spindle 26 is now locked to gear 30 and the spool will rotate three revolutions to one revolution of the crank. The shaft 26 is yieldingly held in any one of these three positions by engagement of the free end of the yieldingly mounted pin 37 in any one of the notches 38. The advantages of this construction are a plurality of relative speeds of the spool with respect to the winding crank and also a free spool, and any one of these conditions may be secured without removing the hand from the crank handle by merely pushing it in or moving it outwardly.

On the opposite end of the spindle 10 is a disc 40 having notches in its periphery for coaction with the usual click 41 adjustably mounted in the plate 12. This click may be moved to and from engagement of the disc by a thumb piece 42. A suitable brake or drag is also provided. In the present instance it comprises a fork 43 provided with fingers 44 adapted to engage opposite sides of the disc. The connection of the fingers to this support is shown thin at 45 to form a spring mounting for these fingers, and they are moved to and from engagement with the disc by a suitable thumb piece 46. As the fingers 44 press equally on opposite sides of the disc when engaging it there is no end thrust on the spindle 10, the lateral pressure being the same in both directions.

Having thus set forth the nature of my invention, what I claim is:

1. In a fishing reel, a rotatable spindle, a spool secured thereto, a plurality of gears secured to said spindle, a second spindle offset laterally from the first spindle and slidable longitudinally of its axis, a crank for operating said second spindle, a sleeve embracing the second spindle provided with a longitudinal slot and a central flange having a notch in alignment with said slot, means for holding said sleeve against sliding movement, a pair of gears mounted to rotate on said sleeve on opposite sides of said flange and meshing with the first mentioned gears, said gears being provided with recesses, a pin carried by the second spindle projecting through said slot and adapted to be moved by sliding movement of the spindle into the notches in the flange or gears, and means for yieldingly holding the spindle in different positions.

2. In a fishing reel, a rotatable spindle, a spool secured thereto, a plurality of gears secured to said spindle, a second spindle offset laterally from the first spindle and slidable longitudinally of its axis, a crank for operating said second spindle, a sleeve embracing the second spindle provided with a longitudinal slot and a central flange having a notch in alignment with said slot, means for holding said sleeve against sliding movement, a pair of gears mounted to rotate on said sleeve on opposite sides of said flange and meshing with the first mentioned gears, said gears being provided with recesses, and a pin carried by the second spindle projecting through said slot and adapted to be moved by sliding movement of the spindle into the notches in the flange or gears.

3. In a fishing reel, a rotatable spindle, a spool secured thereto, a pair of gears of different diameters secured to said spindle, a second spindle offset laterally from the first spindle and slidable longitudinally of its axis, a crank for operating said second spindle, a sleeve on the second spindle having a longitudinal slot therein, a pair of gears of different diameters mounted to rotate on the sleeve and meshing with the first mentioned gears, means on the sleeve to maintain the second pair of gears separated, means to hold the sleeve against sliding movement, driving means carried by the second spindle projecting through said slot, the gears on the sleeve being provided with means to coact with said driving means to operate the gears, and means to yieldingly hold the driving means in engagement with either gear or in the space between the gears.

In testimony whereof I affix my signature.

GEORGE F. MILES.